US009794509B2

(12) United States Patent
Yamamoto

(10) Patent No.: US 9,794,509 B2
(45) Date of Patent: Oct. 17, 2017

(54) DISPLAY DATA PROCESSOR AND DISPLAY DATA PROCESSING METHOD

(71) Applicant: KABUSHIKI KAISHA TOSHIBA, Minato-ku, Tokyo (JP)

(72) Inventor: Takanori Yamamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/216,557

(22) Filed: Jul. 21, 2016

(65) Prior Publication Data
US 2016/0330401 A1   Nov. 10, 2016

Related U.S. Application Data

(63) Continuation of application No. 14/158,520, filed on Jan. 17, 2014, now Pat. No. 9,432,649.

(30) Foreign Application Priority Data

Jun. 21, 2013   (JP) .................................. 2013-130924

(51) Int. Cl.
*H04N 5/91* (2006.01)
*H04N 7/01* (2006.01)
*H04N 9/79* (2006.01)
*H04N 5/44* (2011.01)
H04N 5/913 (2006.01)

(52) U.S. Cl.
CPC ............. *H04N 7/0122* (2013.01); *H04N 5/44* (2013.01); *H04N 5/91* (2013.01); *H04N 9/7921* (2013.01); H04N 5/913 (2013.01)

(58) Field of Classification Search
None
See application file for complete search history.

(56) References Cited

U.S. PATENT DOCUMENTS

| 5,353,062 A | 10/1994 | Maeda |
| 9,432,649 B2 * | 8/2016 | Yamamoto ............... H04N 5/91 |
| 2002/0085829 A1 | 7/2002 | Fujinami |

(Continued)

FOREIGN PATENT DOCUMENTS

| JP | H05-122687 A | 5/1993 |
| JP | H05-342124 A | 12/1993 |

(Continued)

*Primary Examiner* — Eileen Adams
(74) *Attorney, Agent, or Firm* — Rutan & Tucker, LLP

(57) ABSTRACT

A video receiving device comprises a receiver, a transmitter, and at least one hardware processor. The receiver is configured to receive video data and first data from a video transmitting device. The hardware processor is configured to output a moving image, generated from the video data, to a display. The receiver further stops outputting the moving image based on the first data and outputs a static image to the display based on the first data when the receiver receives the first data. While the hardware processor outputs the moving image to the display, the static image is generated from the video data received by the receiver. The transmitter is configured to transmit second data to the video transmitting device based on the first data while the hardware processor outputs the moving image to the display. The second data causes the video transmitting device to stop transmitting the video data.

10 Claims, 7 Drawing Sheets

(56) References Cited

U.S. PATENT DOCUMENTS

| | | | |
|---|---|---|---|
| 2006/0071920 A1 | 4/2006 | Ishimatsu et al. | |
| 2006/0074550 A1* | 4/2006 | Freer | G06Q 30/02 |
| | | | 701/533 |
| 2009/0235321 A1 | 9/2009 | Wu et al. | |
| 2010/0295966 A1 | 11/2010 | Furlan | |
| 2011/0007175 A1 | 1/2011 | Fujita et al. | |
| 2011/0113442 A1 | 5/2011 | Kikkawa | |
| 2011/0179146 A1* | 7/2011 | Park | H04L 12/2809 |
| | | | 709/219 |

FOREIGN PATENT DOCUMENTS

| | | |
|---|---|---|
| JP | 2001-147673 A | 5/2001 |
| JP | 2002-051307 A | 2/2002 |
| JP | 2003-264798 A | 9/2003 |
| JP | 2004-120606 A | 4/2004 |
| JP | 2004-354913 A | 12/2004 |
| JP | 2007-061233 A | 3/2007 |
| JP | 2009-296081 A | 12/2009 |
| JP | 2010-004353 A | 1/2010 |
| JP | 2010-026455 A | 2/2010 |
| JP | 2010-068509 A | 3/2010 |
| JP | 2010-118772 A | 5/2010 |
| JP | 2010-130287 A | 6/2010 |
| JP | 2011-030026 A | 2/2011 |
| JP | 2012-147372 A | 8/2012 |

* cited by examiner

FIG.4

|  | MOVING IMAGE BEING DISPLAYED | IN STATIC CONDITION |
|---|---|---|
| HIGH-QUALITY IMAGE PROCESSING A | ON | ON |
| HIGH-QUALITY IMAGE PROCESSING B | ON | ON |
| HIGH-QUALITY IMAGE PROCESSING C | OFF | ON |
| HIGH-QUALITY IMAGE PROCESSING D | OFF | ON |
| HIGH-QUALITY IMAGE PROCESSING E | OFF | ON |
| HIGH-QUALITY IMAGE PROCESSING F | ON | OFF |

FIG.5

|  | NOT PROTECTED BY COPYRIGHT | PROTECTED BY COPYRIGHT |
|---|---|---|
| HIGH-QUALITY IMAGE PROCESSING A | ON | ON |
| HIGH-QUALITY IMAGE PROCESSING B | ON | ON |
| HIGH-QUALITY IMAGE PROCESSING C | OFF | ON |
| HIGH-QUALITY IMAGE PROCESSING D | OFF | OFF |
| HIGH-QUALITY IMAGE PROCESSING E | OFF | OFF |
| HIGH-QUALITY IMAGE PROCESSING F | ON | ON |

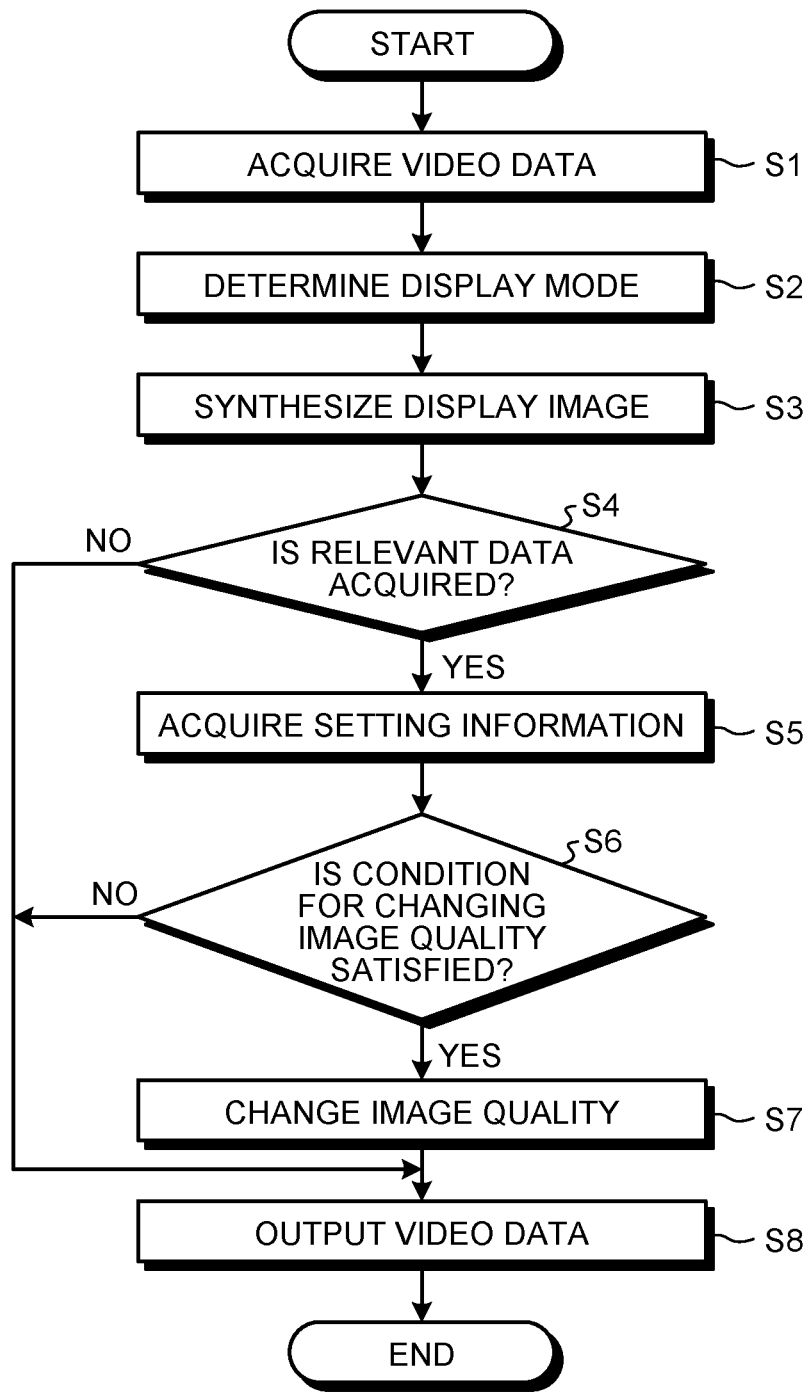

| HIGH-QUALITY IMAGE PROCESSING A | ON | (0, 0) | 1920×1080 |
|---|---|---|---|
| HIGH-QUALITY IMAGE PROCESSING B | ON | (0, 0) | 1920×1080 |
| HIGH-QUALITY IMAGE PROCESSING C | ON | (960, 0) | 960×1080 |
| HIGH-QUALITY IMAGE PROCESSING D | OFF | – | – |
| HIGH-QUALITY IMAGE PROCESSING E | OFF | – | – |
| HIGH-QUALITY IMAGE PROCESSING F | ON | (0, 0) | 1920×1080 |

| HIGH-QUALITY IMAGE PROCESSING A | ON | (0, 0) | 1920×1080 |
|---|---|---|---|
| HIGH-QUALITY IMAGE PROCESSING B | ON | (0, 0) | 1920×1080 |
| HIGH-QUALITY IMAGE PROCESSING C | ON | (0, 0) | 1920×1080 |
| HIGH-QUALITY IMAGE PROCESSING D | ON | (0, 0) | 960×1080 |
| HIGH-QUALITY IMAGE PROCESSING E | ON | (0, 0) | 960×1080 |
| HIGH-QUALITY IMAGE PROCESSING F | ON | (960, 0) | 960×1080 |

DISPLAY DATA PROCESSOR AND DISPLAY DATA PROCESSING METHOD

CROSS-REFERENCE TO RELATED APPLICATIONS

This application is a continuation of U.S. patent application Ser. No. 14/158,520 filed Jan. 17, 2014, now U.S. Pat. No. 9,432,649 issued Aug. 30, 2016, which is based upon and claims the benefit of priority from Japanese Patent Application No. 2013-130924, the entire contents of both of which are incorporated herein by reference.

FIELD

Embodiments described herein relate generally to a display data processor and a display data processing method.

BACKGROUND

Conventionally, there has been known a technique that enhances quality of video of a content and display the high-quality video.

For such technique, it is preferable to be able to more efficiently decrease a load of an arithmetic processor due to processing of changing image quality.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary diagram illustrating one example of high-quality image processing performed in each of a condition in which video is displayed as a moving image and a condition in which the video image is displayed in a static in the display data processor in the embodiment;

FIG. 5 is an exemplary diagram illustrating one example of high-quality image processing performed depending on presence or absence of copyright protection in the display data processor in the embodiment;

FIG. 6 is an exemplary flowchart illustrating one example of image quality change processing performed by the display data processor in the embodiment;

DETAILED DESCRIPTION

Figure 1:
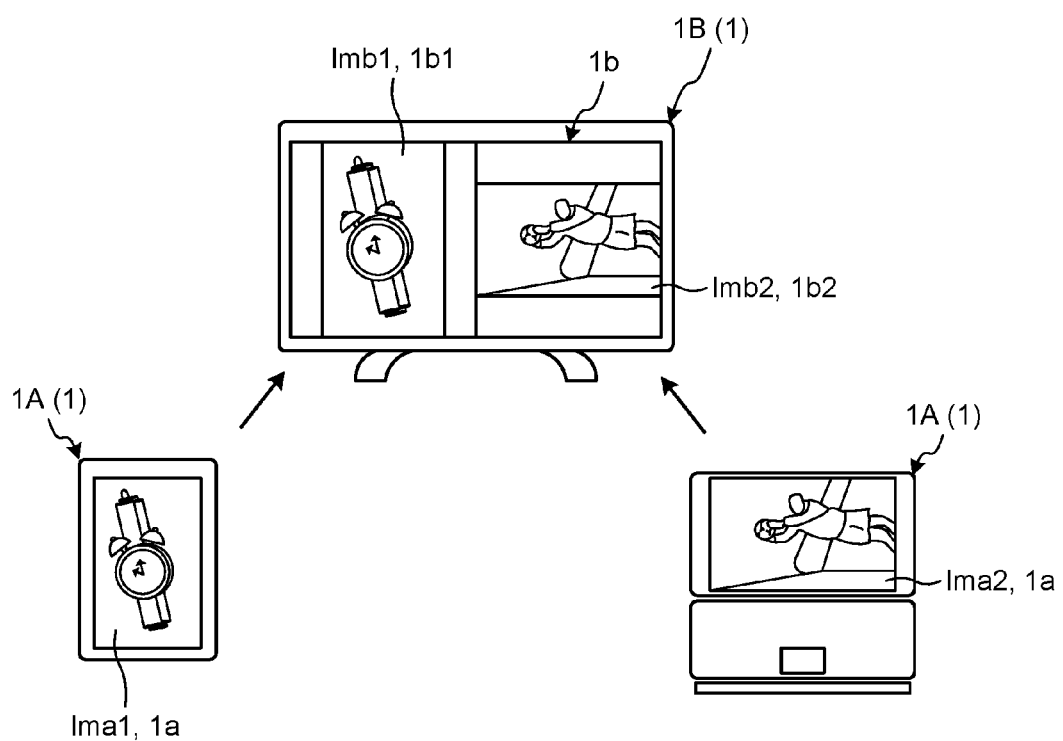
FIG. 1 is an exemplary diagram illustrating one example of a system comprising a display data processor according to an embodiment.

In general, according to one embodiment, a display data processor comprises a first acquisition module, at least one image quality change module, a second acquisition module, a controller, and an output module. The first acquisition module is configured to acquire display data for displaying video on a display screen. The at least one image quality change module configured to perform processing to change image quality on the display data. The second acquisition module configured to acquire data corresponding to the video and instructing pause of the video. The controller configured to change an operation of the at least one image quality change module based on the data acquired by the second acquisition module. The output module configured to output one of the display data on which the processing is performed by the at least one of the image quality change modules and the display data that is acquired by the first acquisition module.

The following embodiment and modifications comprise the same configuration elements. The same configuration elements are given the same reference numerals, and duplicate descriptions thereof are omitted. The embodiment and the modifications containing the same configuration elements can attain the same results (effects) based on the same configuration elements. Ordinal numbers such as first and second in the present specification are given for convenience in order to distinguish the configuration elements or the like, and do not represent, for example, the order of processing, priority, or importance.

In the present embodiment, for example, as illustrated in FIG. 1, at least one (two, for example, in the present embodiment) electronic device 1A (1) and one electronic device 1B (1) are connected such that data is transmittable and receivable (communicable) through wire or wirelessly. The electronic devices 1A and 1B may communicate directly, or may communicate indirectly via an electronic device such as a router. The electronic devices 1 are, for example, a television receiver, a personal computer, a smartphone, a mobile phone, a personal digital assistant (PDA), a game player, an electronic dictionary, and an electronic book reader. The electronic devices 1 do not necessarily integrally comprise a display screen 1a or a display screen 1b and an audio output device (a speaker, not illustrated), but may be a set-top box, a home terminal, or the like.

Data (display data) of video (an image, a moving image, or a static image) and data (audio data) of a sound are sent from the electronic device 1A to the electronic device 1B using a predetermined communication protocol. The electronic device 1B displays the video on the basis of the received data, and outputs the corresponding sound. Hereinafter, the electronic device 1A that transmits data of video and data of a sound is referred to as a source device 1A, and the electronic device 1B that receives the data of video and the data of a sound is referred to as a sink device 1B. In the present embodiment, the source device 1A is an example of a first electronic device, and the sink device 1B is an example of a second electronic device. The sink device 1B (electronic device) is also an example of the display data processor in the present embodiment. When data of video and data of a sound are transmitted or received, encryption and decryption processing may be performed as appropriate.

In the present embodiment, for example, data of video (a screen video, a screen image) displayed on the display screen 1a corresponding to the source device 1A is transmitted (transferred) to the sink device 1B, and the video is displayed on the display screen 1b corresponding to the sink device 1B. The display screen 1b of the sink device 1B comprises a display region 1b1 and a display region 1b2 corresponding to respective source devices 1A. The display regions may be only one region corresponding to one source device 1A. In the present embodiment, for example, as illustrated in FIG. 1, the video Imb1 corresponding to (the same as) the video Ima1 displayed on the display screen 1a of the source device 1A (a tablet, for example) illustrated in the left side of FIG. 1 is displayed on the display region 1b1 in the left side of the display screen 1b of the sink device 1B, and the video Imb2 corresponding to (the same as) video Ima2 displayed on the display screen 1a of the source device 1A (a personal computer, for example) illustrated in the right side of FIG. 1 is displayed on the display region 1b2 in the right side of the display screen 1b of the sink device 1B. It should be noted that FIG. 1 is only an example, and display modes can be changed in various ways.

Between the source device 1A and the sink device 1B, relevant data (instruction data, metadata, and control data, for example) corresponding to the video and the sound is also transmitted and received using a predetermined protocol. Display of the video and output of the sound, arithmetic processing associated therewith, and the like can be controlled on the basis of the relevant data. Specifically, the relevant data may be, for example, instruction data that instructs pause and play (resume, cancellation of pause) of the video of moving images, metadata indicating whether content of the video of the moving images (content displayed as a screen video) is protected by copyright (presence or absence of copyright protection), and metadata indicating identification information of the source device 1A. As the metadata indicating whether the content is protected by copyright, data (flag) indicating presence or absence of copyright protection, data of copyright protection information included in the content, or data of encryption key can be used, for example.

Figure 2:
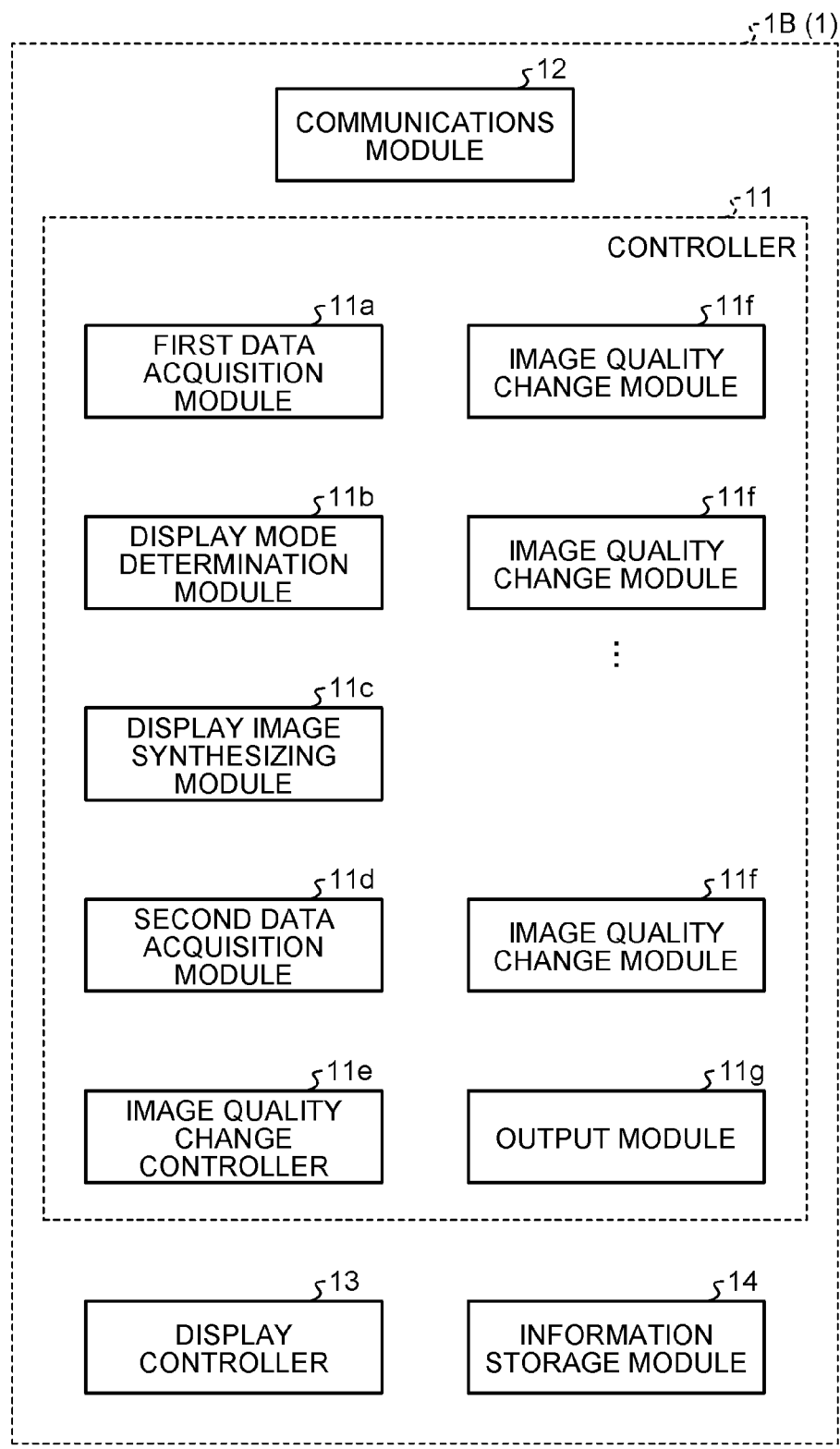
FIG. 2 is an exemplary block diagram illustrating a schematic configuration of one example of the display data processor in the embodiment.

In the present embodiment, for example, the sink device 1B illustrated in FIG. 2 is configured as a computer and comprises a central processing unit (CPU), a controller, a storage module, an input module, an output module, and a communications module 12. The communications module 12 executes transmission and reception (communication) of data to and from the source device 1A. The storage module is, for example, a random access memory (RAM), a read only memory (ROM), a hard disk drive (HDD), or a solid state drive (SSD). The storage module comprises an information storage module 14. The information storage module 14 is a non-volatile storage module, and is the HDD or the SSD, for example. The controller comprises a display controller 13. The display controller 13 controls a display device so that a video image is displayed on the basis of data received from a controller 11. The display controller 13 may be an example of the output module. The display device is, for example, a liquid crystal display (LCD) or an organic electro-luminescent display (OELD). The CPU can execute various types of arithmetic processing in accordance with loaded programs (an operating system [OS], an application, and a web application, for example). In the present embodiment, for example, processing of the CPU or the like in accordance with the programs causes the controller 11 (a first data acquisition module 11a, a display mode determination module 11b, a display image synthesizing module 11c, a second data acquisition module 11d, an image quality change controller 11e, an image quality change module 11f, and an output module 11g) illustrated in FIG. 2 to function.

Although the configuration is not illustrated, the source device 1A is also configured as a computer and comprises a CPU, a controller, a storage module, an input module, an output module, and a communications module. The storage module is, for example, a RAM, a ROM, an HDD, or an SSD.

Computer programs for the source device 1A, the sink device 1B, or the like may be provided in such a manner in which the programs are recorded as files in an installable format or in an executable format in a storage media, such as a compact disc ROM (CD-ROM), a flexible disc (FD), a CD recordable (CD-R), or a digital versatile disc (DVD), that can be read by a computer. The programs may be stored in a storage module of a computer connected to a communication network, and may be installed by downloading via the network. The program may be prebuilt in the ROM or the like.

The first data acquisition module 11a (a first acquisition module) of the sink device 1B acquires data of video and data of sound from, for example, the source device 1A. The first data acquisition module 11a can decrypt encrypted data as necessary.

The display mode determination module 11b determines a display mode of, for example, video (an image, a moving image or a static image) corresponding to the data of the video acquired by the first data acquisition module 11a on the display screen 1b corresponding to the sink device 1B. The display mode determination module 11b can determine, for example, the number, position, and size of a display region for the video on the basis of information stored in the information storage module 14. The information storage module 14 may store, for example, identification information (a device specific number, an IP address, and a MAC address, for example) of a connectable source device 1A. The information storage module 14 may store information such as the identification information and the number of source devices 1A, and information such as the number, position, and size of the display region for the video on the display screen 1b of the sink device 1B in a manner associated with each other. Accordingly, the display mode determination module 11b can determine the display mode of the video on the basis of the identification information and the number of source devices 1A corresponding to the video. The display mode determination module 11b can also determine a display mode of the video on the basis of instruction data and control data with respect to the display mode that the second data acquisition module 11d has acquired from the source device 1A or the like.

The display image synthesizing module 11c synthesizes, for example, data to display video and data to display an additional information into image data displayed on the display screen 1b corresponding to the sink device 1B.

The second data acquisition module 11d (a second acquisition module, a third acquisition module) acquires relevant data corresponding to the video from, for example, the source device 1A and a remote controller (not illustrated).

The image quality change controller 11e changes, for example, an operation state of the image quality change module 11f (a high-quality image processing module). When the controller 11 comprises a plurality of image quality change modules 11f, the image quality change controller 11e can switch on and off (operation and stop) of each of the image quality change modules 11f. The image quality change modules 11f perform processing to change image quality (processing to enhance image quality) of video data. In addition, the image quality change module 11f can change the image quality change modules 11e that perform processing on each of the display regions 1b1 and 1b2 of the display screen 1b. The image quality change controller 11e is an example of the controller.

The output module 11g outputs video data (display data) to the display controller 13 (and then to the display device).

The controller 11 can comprise a plurality of image quality change modules 11f. Specifically, the controller 11 can comprise, for example, an image quality change module 11f that performs processing of texture restoration. The texture restoration is a technique to restore minute patterns in video that were lost when the video was captured by generating more minute patterns on the basis of luminance changing patterns of the video. The controller 11 can comprise, for example, an image quality change module 11f that performs processing of gloss restoration. The gloss restoration is a technique to restore gloss of video that was lost when the video was captured by separating a gloss component of the video and enhancing it. The controller 11 can comprise, for example, an image quality change module 11f that performs processing of depth feel recovery. The depth feel recovery is a technique that gives video a characteristic in which an object in the video is seen with a sense of distance. This is achieved, for example, by simply enlarging a region of the sky or the infinity so as not to enhance noises, by performing super resolution processing on a region of a distant view such that the processing causes a smaller super resolution effect than that in a normal condition, and by performing the super resolution processing on a region of a close-distance view such that the processing causes a normal super resolution effect. In addition, the controller 11 can comprise other image quality change modules 11f that perform various types of processing such as noise reduction, super resolution processing using a plurality of frames, and high-quality image processing based on histograms. The controller 11 can also comprise an image quality change module 11f that performs high-quality image processing on a plurality of frames of video (image) (before being paused) as high-quality image processing in a static condition (pause condition) of a moving image. The controller 11 can comprise a CPU dedicated to image quality change processing (high-quality image processing).

Figure 3:
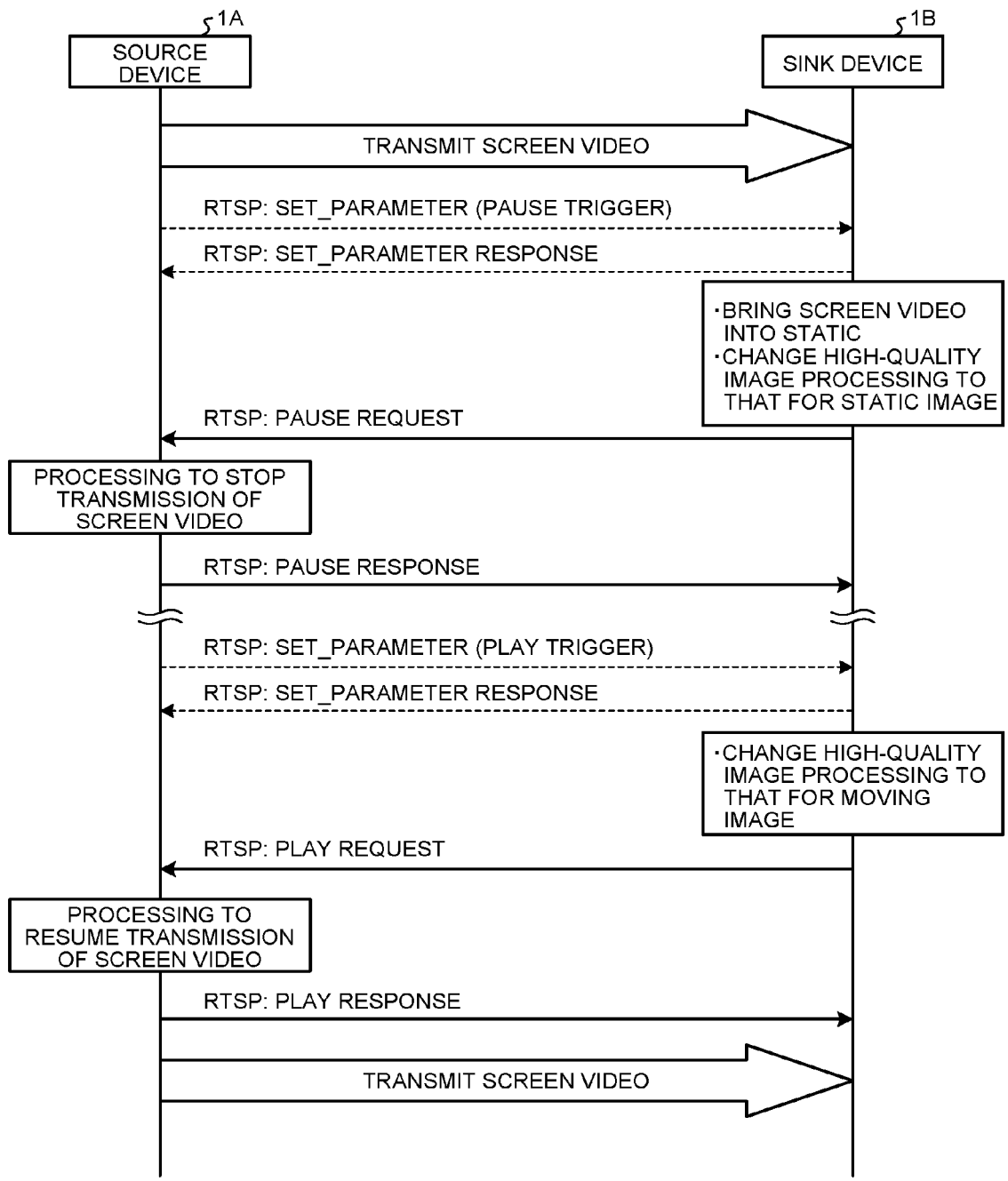
FIG. 3 is an exemplary diagram illustrating one example of a processing sequence in the system comprising the display data processor in the embodiment.

The controller 11 can change image quality of video data in accordance with, for example, the procedure illustrated in FIG. 3. FIG. 3 illustrates an example of a processing sequence used in a case in which the operation of an image quality change module 11f is changed depending on whether video of moving images is displayed as moving images or the moving image is displayed in a static condition. Specifically, while a screen video (video) is being transmitted from the source device 1A to the sink device 1B, the source device 1A transmits to the sink device 1B instruction data (relevant data, SET_PARAMETER [PAUSE trigger] of real time streaming protocol [RTSP]) that instructs pause of display of the video, and then, the sink device 1B transmits a response (SET_PARAMETER response) thereof to the source device 1A. The controller 11 and the display controller 13 of the sink device 1B put the moving image into a static condition. In other words, the controller 11 and the display controller 13 display one frame out of a plurality of frames constituting the moving images on the display screen 1b corresponding to the sink device 1B. At this time, the image quality change controller 11e changes image quality change modules 11f to operate in accordance with, for example, FIG. 4. In an example illustrated in FIG. 4, the image quality change controller 11e controls the image quality change modules 11f to perform high-quality image processing A, B, and F to each frame in the moving images while the moving image is displayed, and controls the image quality change modules 11f to perform high-quality image processing A to E to one frame in the moving image when the moving image is displayed in the static condition. A plurality of (six, for example, in the present embodiment) different types of high-quality image processing A to F can be performed, for example, by a plurality of (six, for example, in the present embodiment) respective image quality change modules 11f. In this case, while a moving image is displayed, the image quality change controller 11e causes three image quality change modules 11f to operate that perform the high-quality image processing A, B, and F, respectively, whereas the image quality change controller 11e causes the other three image quality change modules 11f not to operate that perform the high-quality image processing C to E, respectively. When the video of the moving images is displayed in the static condition, the image quality change controller 11e causes five image quality change modules 11f to operate that perform the high-quality image processing A to E, respectively, whereas the image quality change controller 11e causes the remaining one image quality change module 11f not to operate that performs the high-quality image process F. It is apparent from FIG. 4 that, depending on whether the video of the moving images is displayed as a moving image (a moving image is displayed) or displayed in the static condition, the operation of at least one image quality change module 11f differs as well as the number of image quality change modules 11f that operate (perform processing) differs. Further, it is apparent from FIG. 4 that the number of image quality change modules 11f that perform processing when the video of the moving images is displayed as a moving image is smaller than the number of image quality change modules 11f that perform processing when the video of the moving images is displayed in the static condition. While moving images are displayed, the controller 11 bears a large load of arithmetic processing, whereas the controller 11 bears a small load thereof when video in the static condition is displayed. In the present embodiment, therefore, the load of the controller 11 (arithmetic processing module) can be reduced more efficiently by switching such image quality change modules 11f, for example.

The information storage module 14 stores information (setting information such as a table) that indicates operation states illustrated, for example, in FIG. 4 of the image quality change modules 11f in each case in which the moving image is displayed or the video is in the static condition. The image quality change controller 11e can switch the operation of the image quality change modules 11f on the basis of the information.

As illustrated in FIG. 3, after the controller 11 and the display controller 13 of the sink device 1B put the video of the moving images into the static condition, and the image quality change controller 11e changes the image quality change modules 11f to operate in accordance with, for example, FIG. 4, the sink device 1B transmits instruction data (relevant data, PAUSE request of RTSP) that instructs stop of transmission of video image data to the source device 1A. This causes the source device 1A to stop transmitting the video data and transmits a response (PAUSE response) thereof to the sink device 1B.

Thereafter, when the source device 1A transmits instruction data (relevant data, SET_PARAMETER [PLAY trigger] of RTSP) that instructs start (resume) of display (play) of the video to the sink device 1B, the sink device 1B transmits a response (SET_PARAMETER response) thereof to the source device 1A. The image quality change controller 11e of the sink device 1B changes the image quality change modules 11f to operate in accordance with, for example, FIG. 4. In this case, the operation state is returned to the state before pause. The sink device 1B transmits instruction data (relevant data, PLAY request of RTSP) that instructs start (resume) of transmission of the video data to the source device 1A. This causes the source device 1A to transmit a response (PLAY response) thereof to the sink device 1B and start (resume) transmitting the video data.

In the present embodiment, for example, the controller 11 can change image quality of video data depending on whether (content of) video is protected by copyright as illustrated in FIG. 5. In an example of FIG. 5, the image quality change controller 11e controls the image quality change modules 11f to perform the high-quality image processing A, B, and F to each frame of the video when the video is not protected by copyright, and controls the image quality change modules 11f to perform the high-quality image processing A to C, and F to each frame of the video when the video is protected by copyright. In this case, when the video is not protected by copyright, the image quality change controller 11e causes three image quality change modules 11f to operate that perform the high-quality image processing A, B, and F, respectively, whereas the image quality change controller 11e causes the remaining three image quality change modules 11f not to operate that perform the high-quality image processing C to E, respectively. When the video is protected by copyright, the image quality change controller 11e causes four image quality change modules 11f to operate that perform the high-quality image processing A to C, and F, respectively, whereas the image quality change controller 11e causes the remaining two image quality change modules 11f not to operate that perform the high-quality image processing D and E. It is apparent from FIG. 5 that, depending on whether the video is protected by copyright, the operation of at least one image quality change module 11f differs as well as the number of image quality change modules 11f that operate (perform processing) differ. Further, it is apparent from FIG. 5 that the number of image quality change modules 11f that perform processing when the video is not protected by copyright is smaller than the number of image quality change modules 11f that perform processing when the video is protected by copyright. In general, (content of) video protected by copyright is more important and valuable, and also is a higher resolution image than video not protected by copyright in most cases. In the present embodiment, therefore, the load of the controller 11 (arithmetic processing module) can be reduced more efficiently by switching the image quality change modules 11f, for example.

Next, it is descried a series of processing (procedure) performed by the controller 11, with reference to FIG. 6. The controller 11 of the sink device 1B operates as the first data acquisition module 11a and acquires video data (image data, display data) from the source device 1A (S1). The controller 11 operates as the display mode determination module 11b and determines the display mode of the video (image) on the display screen 1b (S2). The controller 11 operates as the display image synthesizing module 11c and synthesizes data to display the video, data to display additional information, and the like into data of an image to be displayed on the display screen 1b corresponding to the sink device 1B (S3).

When the controller 11 operating as the second data acquisition module 11d acquires relevant data corresponding to the video (Yes at S4), the controller 11 operates as the image quality change controller 11e, and, with reference to the information storage module 14, acquires the setting information with regard to image quality change (S5). The controller 11 operates as the image quality change controller 11e, and, when the information acquired from the relevant data satisfies a condition for changing image quality (Yes at S6), the controller 11e determines image quality change modules 11f to operate, and controls the image quality change modules 11f, thereby changing image quality of the video data (S7). Next, the controller 11 and the display controller 13 output the video data to the display device, thereby displaying the video data (display data) on the display screen 1b (S8). When No is selected at S4 or at S6, the procedure proceeds to S8.

Figures 7, 8:
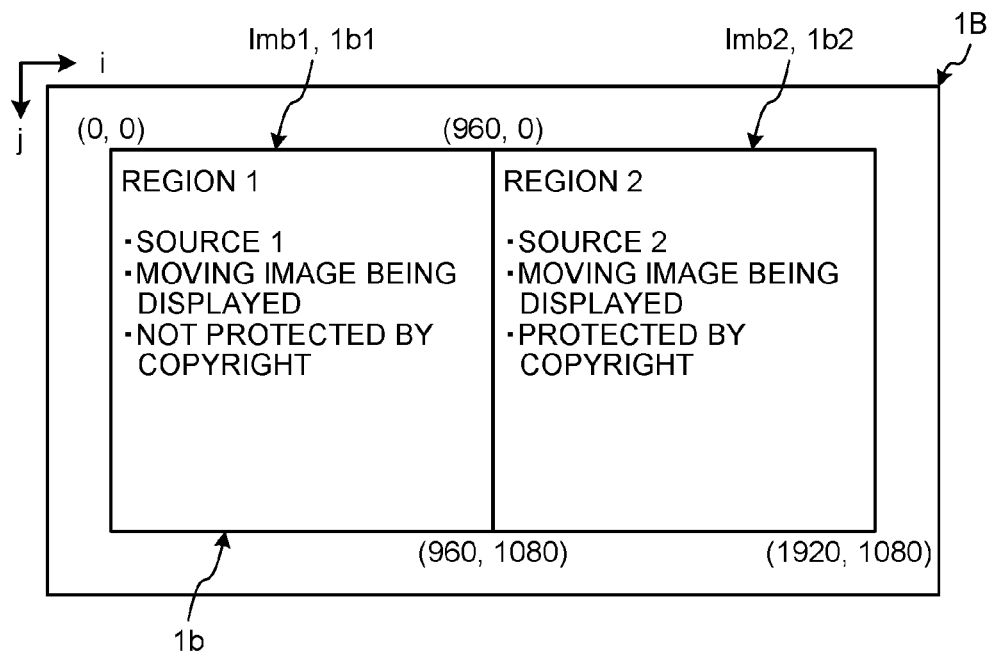
FIG. 7 is an exemplary schematic diagram illustrating one example of display in each region of a display screen corresponding to the display data processor in the embodiment.
FIG. 8 is an exemplary diagram illustrating one example of high-quality image processing performed for each region in FIG. 7, in the embodiment.

FIG. 7 illustrates one example of an outline of video images displayed on the display screen 1b when two source devices 1A each transmit video data to one sink device 1B, and the display screen 1b corresponding to the sink device 1B is provided with the display regions 1b1 and 1b2 that correspond to the respective source devices 1A and that display respective screen images of the source devices 1A. As illustrated in FIG. 7, the display region 1b1 (region 1) in the left side of the display screen 1b displays video from a source device 1A (source 1). The (content of the) video data from the source device 1A (source 1) is not protected by copyright. The display region 1b2 (region 2) in the right side of the display screen 1b displays video from the other source device 1A (source 2). The (content of the) video data from the source device 1A (source 2) is protected by copyright. The display regions 1b1 and 1b2 both display the video as moving images in the example of FIG. 7.

FIG. 8 illustrates one example of operation states (ON/OFF, under operation and stop) and operation regions of the image quality change modules 11f in the example of FIG. 7 that perform the respective high-quality image processing A to F. The image quality change controller 11e determines the operation states of the image quality change modules 11f illustrated in FIG. 8 on the basis of information obtained from relevant information. The image quality change modules 11f perform image quality change processing on the regions illustrated in FIG. 8. In the example of FIG. 8, regions to which the image quality change processing is performed are defined by a starting point and a size indicating how large it is from the starting point. In the examples in FIGS. 7 and 8, the display region 1b1 (region 1) corresponding to a source device 1A (source 1) is a rectangular region defined by two vertexes that are diagonally disposed and are indicated by coordinates (0, 0) and coordinates (960, 1080) with the two axes in the i direction and in the j direction in FIG. 7. The display region 1b2 (region 2) corresponding to the other source device 1A (source 2) is a rectangular region defined by two vertexes that are diagonally disposed and are indicated by coordinates (960, 0) and coordinates (1920, 1080). According to the setting illustrated in FIG. 8, the high-quality image processing A and B are performed on the video in the regions 1 and 2, the high-quality image processing C is performed on the video in the region 2, the high-quality image processing D and E are not performed on the video in the region 1 or in the region 2, and the high-quality image processing F is performed on the video in the regions 1 and 2. In other words, in the case of FIG. 8, the video in the region 1 is subjected to the high-quality image processing A, B and F, and the video in the region 2 is subjected to the high-quality image processing A to C, and F. The image quality change modules 11f can perform different types of image quality change processing (high-quality image processing) to the regions 1 and 2 on the basis of the setting information illustrated, for example, in FIG. 8.

Figures 9, 10:
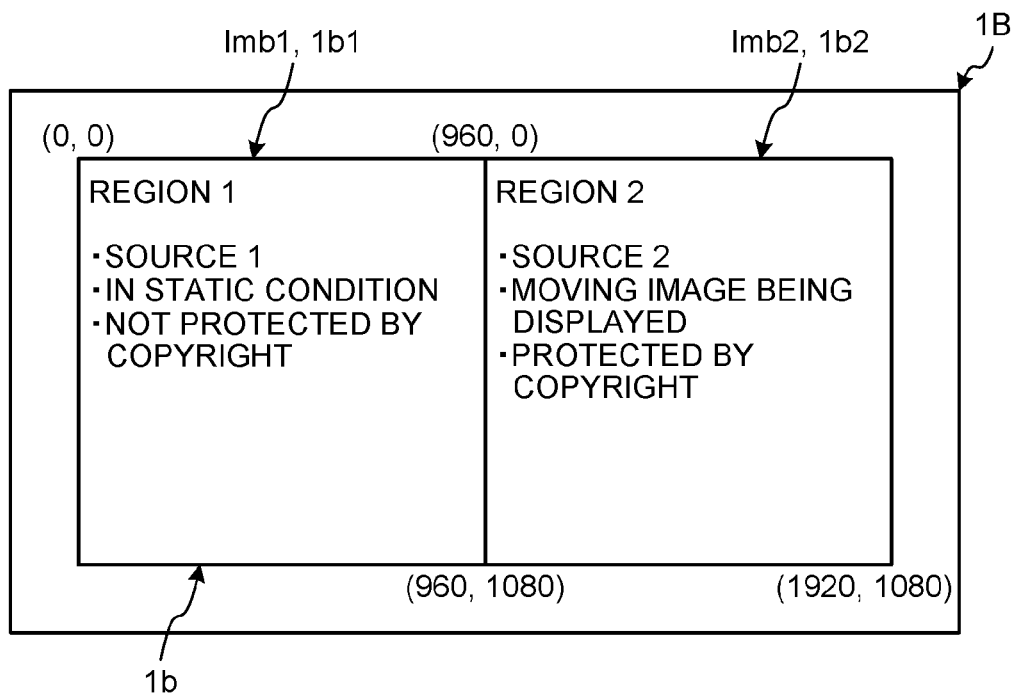
FIG. 9 is an exemplary schematic diagram illustrating another example of display in each region of the display screen corresponding to the display data processor in the embodiment.
FIG. 10 is an exemplary diagram illustrating one example of high-quality image processing performed for each region in FIG. 9, in the embodiment.

FIG. 9 illustrates an example of the outline of the video on the display screen 1b when the video data for the display region 1b1 (region 1) in FIG. 7 is displayed in the static condition.

FIG. 10 illustrates an example of the operation states (ON/OFF, operation and stop) and the operation regions of the image quality change modules 11f in the example of FIG. 9 that perform the respective high-quality image processing A to F. According to the setting illustrated in FIG. 10, the high-quality image processing A to C are performed on the video in the regions 1 and 2, the high-quality image processing D and E are performed on the video in the region 1, and the high-quality image processing F is performed on the video in the region 2. In other words, in the case of FIG. 10, the video in the region 1 is subjected to the high-quality image processing A to E, and the video in the region 2 is subjected to the high-quality image processing A to C, and F. The image quality change modules 11f can perform different types of image quality change processing (high-quality image processing) to the regions 1 and 2 on the basis of the setting information illustrated, for example, in FIG. 10.

As described above, in the present embodiment, for example, the operation of at least one image quality change module 11f is different depending on whether the video for the moving images is displayed as a moving image or displayed in the static condition. Thus, in the present embodiment, for example, the load of the controller 11 (arithmetic processor) can be reduced more easily than that in a configuration in which all the image quality change modules 11f perform (operate) processing on the video image constantly. In the present embodiment, for example, image quality change processing can be performed more efficiently.

In the present embodiment, for example, at least one image quality change module 11f that performs processing on display data when video is displayed as a moving image differs from at least one image quality change module 11f that performs processing on the display data when the video is displayed in a static condition. Thus, in the present embodiment, for example, different types of image quality change processing can be performed relatively easily by switching operation and stop of the processing performed by the image quality change modules 11f.

In the present embodiment, for example, the number of image quality change modules 11f that perform processing on display data when video is displayed as a moving image is smaller than the number of image quality change modules 11f that perform processing on the display data when the video image is displayed in a static condition. Thus, in the present embodiment, for example, image quality of the video in the static condition can be more enhanced in which the controller 11 bears a small load.

In the present embodiment, for example, the image quality change controller 11e determines the image quality change modules 11f to operate on the basis of relevant data corresponding to video. The present embodiment, for example, has advantages of switching the image quality change processing more easily, and of performing more appropriate image quality change processing on the basis of the relevant data corresponding to the video data.

In the present embodiment, for example, one type of relevant data is a type of data that instructs pause of the video. Thus, in the present embodiment, for example, processing to enhance image quality of video of moving images in a static condition can be performed relatively easily using the relevant data as a trigger acquired from the source device 1A.

In the present embodiment, for example, one type of relevant data is a type of data indicating whether content of video is protected by copyright. In the present embodiment, for example, switching of the image quality change processing can be performed more appropriately on the basis of the importance, or the like of (the content of) the video data.

In the present embodiment, for example, different image quality change processing is performed for each of the display regions 1b1 and 1b2 (regions) in the display screen 1b of the sink device 1B. In the present embodiment, for example, the image quality change processing can be performed more efficiently.

Although an embodiment and modifications of the present invention have been described, the embodiment and the modifications have been presented by way of example only, and are not intended to limit the scope of the invention. Indeed, the embodiment and modifications described herein can be embodied in a variety of other forms; furthermore, various omissions, substitutions, combinations, and changes in the form of the embodiment and modifications described herein may be made without departing from the spirit of the invention. The accompanying claims and their equivalents are intended to cover such embodiment or modifications as would fall within the scope and spirit of the invention. The present invention can attain various effects brought by the basic results (effects) obtained by the constituent elements (processes) of the present invention. The above described effects are examples. Specifications of each of the constituent elements can be changed as appropriate to be implemented.

In the above described embodiment, for example, although a case is described in which video data is transmitted from a source device to a sink device, the embodiment is also applicable in a case in which the video data is not transmitted and received between a plurality of electronic devices (a case in which a source and a sink are provided in one electronic device, or a case in which the video data is transmitted from an electronic device to a corresponding display device). Relevant data may be identification data (such as a file name) of video (content), instruction data generated by an operation of an user, metadata indicating priority (identifying priority) of video and source devices (electronic devices), metadata indicating which image quality change processing is performed for each of the source devices (electronic devices), or the like. The display data processor can increase the number of types of the image quality change processing (high-quality image processing) to be performed and can perform the image quality change processing instructed by instruction data for higher priority. Moreover, information (setting information) obtained by associating video and a source device (electronic device), and image quality change processing (high-quality image processing) may be stored in the storage module. The setting information may be rewritable (changeable) by an input operation of the user.

Moreover, the various modules of the systems described herein can be implemented as software applications, hardware and/or software modules, or components on one or more computers, such as servers. While the various modules are illustrated separately, they may share some or all of the same underlying logic or code.

What is claimed is:

1. An electronic apparatus comprising:
a screen;
a receiver configured to receive a continuous video stream from a first electronic apparatus;
a hardware processor configured to:
displaya video image of the continuous video stream on the screen;
receive a first request for displaying a currently displayed video image as a static image from the first electronic apparatus via the receiver while the video image is displayed on the screen; and
display a first image as a static image instead of the video image on the screen, when the receiver receives the first request, wherein the first image corresponds to one of frames of the video image and is specified according to the first request; and
a transmitter configured to transmit a first response of the first request to the first electronic apparatus,
wherein the first response causes the first electronic apparatus to stop sending the continuous video stream
wherein
the hardware processor is further configured to resume displaying the video image on the screen when the receiver receives a second request from the first electronic apparatus while the hardware processor displays the first image on the screen.

2. The electronic apparatus of claim 1, wherein the first image corresponds to a currently displayed frame of the video image on the screen, when the receiver receives the first request from the first electronic apparatus while the hardware processor displays the video image on the screen.

3. The electronic apparatus of claim 1, wherein the electronic apparatus is one of a television receiver, a personal computer, a smartphone, a mobile phone, a personal digital assistant (PDA), a game player, an electronic dictionary, and an electronic book reader.

4. An electronic apparatus comprising:
a transmitter configured to:
transmit a continuous video stream to a first electronic apparatus, wherein a video image of the continuous video stream may be displayed on a screen of the first electronic apparatus; and
transmit a first request for displaying a currently displayed video image as a static image on the screen of the first electronic apparatus to the first electronic apparatus during a transmission of the continuous video stream, wherein a first image corresponds to one of frames of the video image is specified according to the first request; and
a receiver configured to receive a first response of the first request to the first electronic apparatus,
wherein the transmitter is configured to stop transmitting the continuous video stream after the receiver has received the first response from the first electronic apparatus, and is further configured to send a second request to resume displaying the video image on the screen of the first electronic apparatus while displaying the first image on the screen.

5. The electronic apparatus of claim 4, wherein the first image corresponds to a currently displayed frame of the video image on the screen, when the first request is received by the first electronic apparatus.

6. The electronic apparatus of claim 4, wherein the electronic apparatus is one of a television receiver, a personal computer, a smartphone, a mobile phone, a personal digital assistant (PDA), a game player, an electronic dictionary, and an electronic book reader.

7. A method of an electronic apparatus, comprising:
receiving a continuous video stream from a first electronic apparatus;
displaying a video image of the continuous video stream on a screen;
receiving a first request for displaying a currently displayed video image as a static image from the first electronic apparatus via the receiver while the video image is displayed on the screen; and
displaying a first image as a static image instead of the video image on the screen, when the receiver receives the first request, wherein the first image corresponds to one of a plurality of frames of the video image and is specified according to the first request;
transmitting a first response of the first request to the first electronic apparatus, wherein the first response causing the first electronic apparatus to stop sending the continuous video stream; and
resuming displaying the video image on the screen and displaying the first image on the screen upon receiving a second request from the first electronic apparatus.

8. The method of claim 7, wherein the first image corresponds to a currently displayed frame of the video image on the screen, displaying the video image on the screen in the case of receiving the first request from the first electronic apparatus.

9. A method of an electronic apparatus, comprising:
transmitting a continuous video stream to a first electronic apparatus, wherein a video image of the continuous video stream may be displayed on a screen of the first electronic apparatus; and
transmitting a first request for displaying a currently displayed video image as a static image on the screen of the first electronic apparatus to the first electronic apparatus during a transmission of the continuous video stream, wherein a first image corresponds to one of a plurality of frames of the video image is specified according to the first request;
receiving a first response of the first request to the first electronic apparatus;
stopping transmitting the continuous video stream after receiving the first response from the first electronic apparatus; and
sending a second request to resume displaying the first image on the screen of the first electronic apparatus while further displaying the first image on the screen.

10. The method of claim 9, wherein the first image corresponds to a currently displayed frame of the video image on the screen, when the first request is received by the first electronic apparatus.

* * * * *